US008621096B2

(12) United States Patent
Jared

(10) Patent No.: US 8,621,096 B2
(45) Date of Patent: Dec. 31, 2013

(54) STORAGE CHARACTERISTIC IDENTIFICATION

(75) Inventor: Matthew A. Jared, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 979 days.

(21) Appl. No.: 12/103,453

(22) Filed: Apr. 15, 2008

(65) Prior Publication Data
US 2009/0259760 A1 Oct. 15, 2009

(51) Int. Cl.
*G06F 15/173* (2006.01)
(52) U.S. Cl.
USPC .......................... 709/230; 709/223; 709/227
(58) Field of Classification Search
None
See application file for complete search history.

(56) References Cited

U.S. PATENT DOCUMENTS

| 6,839,746 B1 * | 1/2005 | Muthiyan et al. | 709/220 |
| 6,985,944 B2 * | 1/2006 | Aggarwal | 709/224 |
| 7,003,527 B1 * | 2/2006 | Lavallee et al. | 709/203 |

OTHER PUBLICATIONS

Case J., M. Fedor, M. Schoffstall, and J. Davin, "A Simple Network Management Protocol (SNMP)", RFC 1157, Published May 1990, Accessed online via http://www.ietf.org/rfc/rfc1157.txt.*
"Fibre Channel—Storage Network Ping (SNPing)" Rev. 0.61, INCITS working draft proposed American National Standard, BSR xxx-200x, T11/Project 1785-D/Rev 0.61, T11/07-116v5, Dec. 4, 2007, 32 pages.
"FCoE Discovery", T/11-07-572v0, Claudio DeSanti, Cisco, Oct. 2007, 28 pgs.
"FCoE Discovery", T/11-07-572v1, Claudio DeSanti, et al., Cisco, Nov. 2007, 41 pgs.
"Requirements for Internet Hosts—Communication Layers", R. Braden (Editor), Network Working Group Request for Comments: 1122, Internet Engineering Task Force, Oct. 1989, 109 pgs.
"Definition of the Differentiated Services Field (DS Field) in the IPv4 and IPv6 Headers", K. Nichols, et al., Cisco Systems, Network Working Group Request for Comments: 2474, Obsoletes: 1455, 1349, Categrory: Standard Track, Dec. 1998, 18 pgs.
"Storage Newtwork Ping Command Line & Application Prgramming Interfaces", Project Proposal for New INCITS Standard, 05-177v1_T11, T11/05-177v1, Apr. 6, 2005, 5 pgs.
"New Terminology and Clarifications for Diffserv", D. Grossman, Motorala, Inc., Network Working Group, Request for Comments: 3260, Updates: 2474, 2475, 2597, Category: Informational, Apr. 2002, 9 pgs.
"Fibre Channel Over TCP/IP (FCIP)", M. Rajagopal, et al., Network Working Group, Request for Comments: 3821, Category: Standards Track, Jul. 2004, 66 pgs.
"Security Architecture for the Internet Protocol", S. Kent, et al., BBN Technologies, Network Working Group, Request for Comments: 4301, Category: Standards Track, Dec. 2005, 90 pgs.

(Continued)

*Primary Examiner* — Patrice Winder
*Assistant Examiner* — Nam Tran
(74) *Attorney, Agent, or Firm* — Christopher K. Gagne

(57) ABSTRACT

In an embodiment, a method is provided that may include generating, at least in part, at least one packet. The at least one packet may include an indication that the at least one packet comprises a control protocol packet. The at least one packet also may include, at least in part, an identification, at least in part, of at least one characteristic of at least one storage device, and/or the at least one packet may indicate, at least in part, a request for the identification. The at least one storage device may be associated, at least in part, with at least one network server. The identification may be generated, at least in part, in response, at least in part, to the request for the identification. Of course, many alternatives, modifications, and variations are possible without departing from this embodiment.

15 Claims, 4 Drawing Sheets

(56) References Cited

OTHER PUBLICATIONS

"Internet Control Message Protocol (ICMPv6) for the Internet Protocol Version 6 (IPv6) Specification", A. Conta, et al., Transwitch, Cisco Systems, Network Working Group, Request for Comments: 4443, Obsoletes: 2463, Updates: 2780, Category: Standards Track, Mar. 2006, 22 pgs.

"Extended ICMP to Support Multi-Part Messages", R. Bonica, et al. Juniper Networks, Cisco Systems, Network Working Group, Request for Comments: 4884, Updates: 792, 4443, Category: Standards Track, Apr. 2007, 17 pgs.

"User Datagram Protocol", J. Postel, 151, RFC 768, Aug. 28, 1980, 3 pgs.

"Internet Control Message Protocol", J. Postel, ISI, Network Working Group, Request for Comments: 777, Updates: IENs 109, 128, Updates: RFC 760, Apr. 1981, 14 pgs.

"Internet Protocol", Darpa Internet Program Protocol Specification, Information Sciences Institute University of Southern California, Prepared for Defense Advanced Research Projects Agency, Sep. 1981, 46 pgs.

"Internet Control Message Protocol", Darpa Internet Program Protocol Specification, J. Postel, ISI, Network Working Group, Request for Comments: 792, Updates: RFCs 777, 760, Updates: IENS 109, 128, Sep. 1981, 20 pgs.

"Transmission Control Protocol", Darpa Internet Program Protocol Specification, Information Sciences Institute University of Southern California, Prepared for Defense Advanced Research Projects Agency, Sep. 1981, 84 pgs.

"Resource Location Protocol", M. Accetta, Carnegie-Mellon University, Network Working Group, Request for Comments: 887, Dec. 1983, 15 pgs.

* cited by examiner

STORAGE CHARACTERISTIC IDENTIFICATION

FIELD

This disclosure relates to storage characteristic identification.

BACKGROUND

In one conventional network storage arrangement, network storage resources are coupled to servers. The servers are coupled to clients. An administrator may generate and transmit to each of the network storage resources respective commands requesting that the network storage resources provide the administrator with information related to the operation and status of the network storage resources. In response to these commands, the network storage resources may generate and transmit to the administrator respective messages comprising the requested information. The administrator then examines the requested information of each of the respective messages from each of the network storage resources.

In this conventional arrangement, the commands and the messages may be in accordance with protocols (e.g., non-standard and/or proprietary protocols) that are not compatible with standard protocols. This may undesirably increase the cost and complexity, and reduce the interoperability of the components comprising this conventional arrangement. It may also increase the management time and effort involved in implementing this conventional arrangement.

Additionally, the generation and transmission to each of the network storage resources of the commands, and the examination of the messages from each of the network storage resources by the administrator, consumes undesirably large amounts of the administrator's processing bandwidth.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
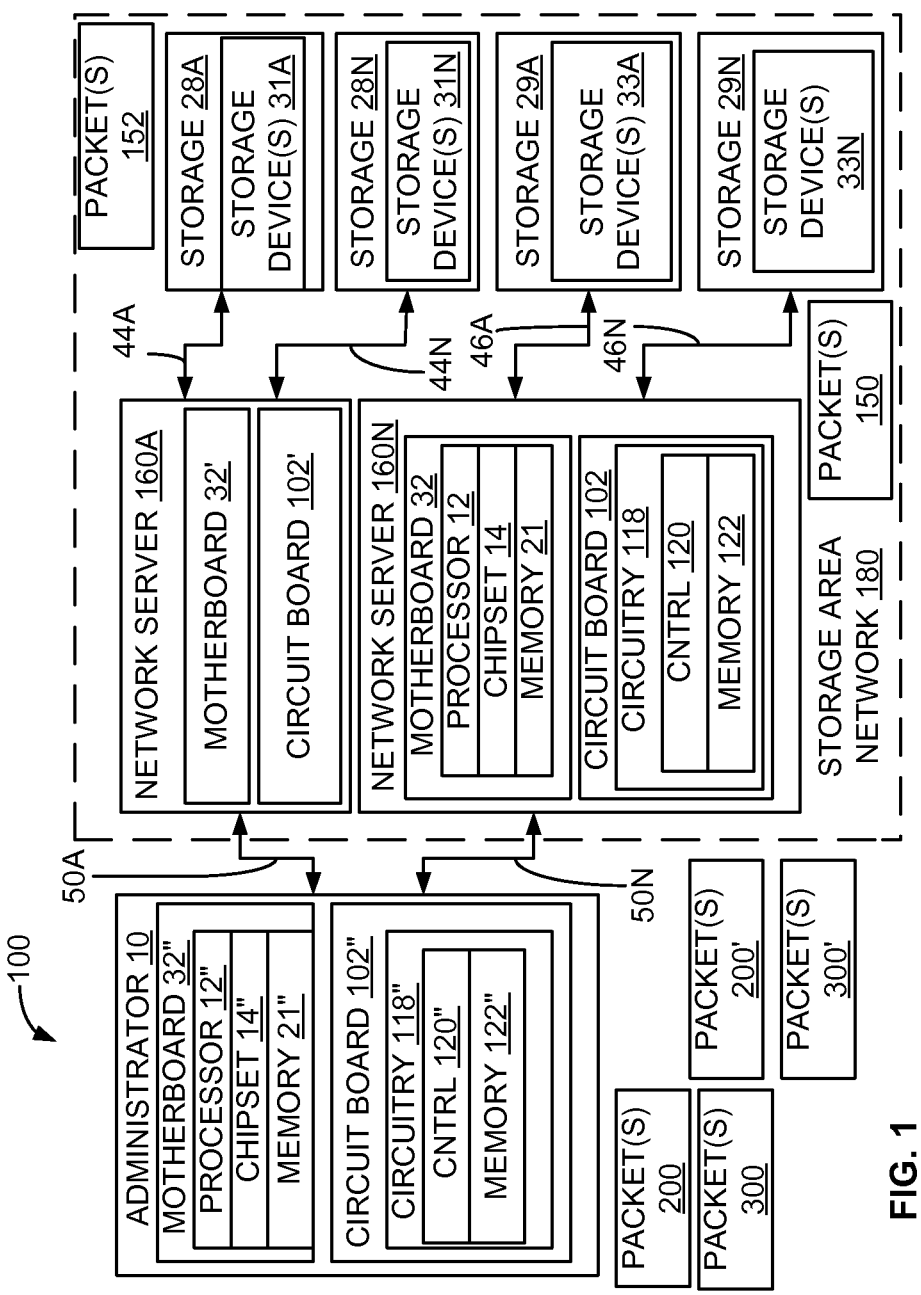
FIG. 1 illustrates a system embodiment.

FIG. 1 illustrates a system embodiment 100. System 100 may include one or more administrators 10 that may be communicatively coupled via one or more communication links 50N to at least one network server 160N. In this embodiment, the one or more administrators 10 may be communicatively coupled via respective sets 50A . . . 50N of one or more communication links to a plurality of network servers 160A . . . 160N.

In system 100, each of the network servers may be communicatively coupled via one or more communication links to storage that may comprise one or more respective storage devices. For example, as shown in FIG. 1, in system 100, network server 160A may be communicatively coupled via respective sets 44A . . . 44N of one or more communication links to storage 28A . . . 28N that may comprise one or more respective storage devices 31A . . . 31N; likewise, in this embodiment, network server 160N may be communicatively coupled via respective sets 46A . . . 46N of one or more communication links to storage 29A . . . 29N that may comprise one or more respective storage devices 33A . . . 33N. System 100 also may comprise one or more clients (not shown) that also may be communicatively coupled via one or more communication links to one or more administrators 10 and one or more network servers 160A . . . 160N.

In this embodiment, as shown in FIG. 1, network server 160N may comprise circuit board 102 and motherboard 32. Motherboard 32 may comprise one or more host processors 12. Each of the host processors 12 may be coupled (e.g., via a respective not shown segment of a proprietary bus) to a chipset 14. Each of the one or more host processors 12 may comprise, for example, a respective Intel® Core™ 2 VPro™ microprocessor that is commercially available from the Assignee of the subject application. As used herein, a "processor" means circuitry capable of performing, at least in part, one or more arithmetic and/or logical operations. Of course, alternatively, each of the host processors 12 may comprise, for example, a respective microprocessor that is manufactured and/or commercially available from a source other than the Assignee of the subject application, without departing from this embodiment.

Chipset 14 may comprise a not shown memory controller hub that may couple one or more host processors 12, a system memory 21 and a not shown user interface system to each other and to a not shown bus system. Chipset 14 may comprise one or more integrated circuit chips selected from, for example, one or more integrated circuit chipsets available from the Assignee of the subject application (e.g., memory controller hub and I/O controller hub chipsets), although one or more other integrated circuit chips may also, or alternatively be used, without departing from this embodiment. The not shown user interface system may comprise, e.g., a keyboard, pointing device, and display system that may permit a human user to input commands to, and monitor the operation of, system 100. The not shown bus system may comprise one or more buses that may comply with the bus protocol described in Peripheral Component Interconnect (PCI) Express™ Base Specification Revision 1.0, published Jul. 22, 2002, available from the PCI Special Interest Group, Portland, Oreg., U.S.A. Alternatively, the bus may comprise other types of bus systems, without departing from this embodiment.

Controller circuit card 102 in network server 160N may be communicatively coupled to storage 29A . . . 29N via links 46A . . . 46N, and may control the operation of storage 29A . . . 29N. In this embodiment, each storage 29A . . . 29N may comprise one or more respective storage devices 33A . . . 33N. The one or more storage devices 33A . . . 33N may each comprise a respective plurality of storage devices that may include respective mass storage that may comprise, e.g., one or more redundant arrays of independent disks (RAID). The RAID level that may be implemented by one or more storage devices 33A . . . 33N may be 0, 1, or greater than 1. Depending upon, for example, the RAID level implemented, the number of storage devices comprised in storage devices 33A . . . 33N may vary so as to permit the number of such storage devices to be at least sufficient to implement the RAID level so implemented.

Likewise, network server 160A may comprise a circuit board 102' and motherboard 32' having substantially the same construction and operation as the construction and operation of circuit board 102 and motherboard 32, respectively, in server 160N. Circuit board 102' may be communicatively coupled to storage 28A . . . 28N via links 44A . . . 44N, and may control the operation of storage 28A . . . 28N. In this embodiment, each storage 28A . . . 28N may comprise one or more respective storage devices 31A . . . 31N. The one or more storage devices 31A . . . 31N may each comprise a respective plurality of storage devices that may include respective mass storage that may comprise, e.g., one or more redundant arrays of independent disks (RAID). The RAID level that may be implemented by one or more storage devices 31A . . . 31N may be 0, 1, or greater than 1. Depending upon, for example, the RAID level implemented, the number of storage devices comprised in storage devices 31A . . . 31N may vary so as to permit the number of such storage devices to be at least sufficient to implement the RAID level so implemented.

As used herein, the terms "storage" and "storage device" may be used interchangeably to mean one or more apparatus into, and/or from which, data may be stored and/or retrieved, respectively. Also, as used herein, the term "mass storage" means storage capable of non-volatile storage of data. For example, in this embodiment, mass storage may include, without limitation, one or more non-volatile magnetic, optical, and/or semiconductor storage devices. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry.

Controller circuit card 102 may comprise operative circuitry 118. Operative circuitry 118 may comprise storage I/O controller 120 and memory 122.

Processors 12, system memory 21, and chipset 14 may be comprised in a single circuit board, such as, for example, system motherboard 32. Motherboard 32 also may comprise the not shown bus system and a not shown bus card slot. Card 102 may include a not shown bus connector that may be capable of being electrically and mechanically coupled to the bus card slot that may be comprised in the motherboard 32. When the bus connector of card 102 is so coupled to the bus card slot comprised in motherboard 32, operative circuitry 118 may become communicatively coupled to mother board 32.

Alternatively, without departing from this embodiment, some or all of the operative circuitry 118 of controller card 102 in network server 160N may not be comprised in card 102, but instead, may be comprised in other structures, systems, and/or devices. These other structures, systems, and/or devices may be, for example, comprised in motherboard 32 (e.g., as part of host processor 12 and/or chipset 14).

Machine-readable program instructions may be stored in computer-readable memory 122 and/or 21. In operation of system 100, these instructions may be accessed and executed by controller 120 and/or one or more host processors 12. When executed by controller 120 and/or one or more host processors 12, these instructions may result in controller 120, operative circuitry 118, host processor 12, and/or card 102 performing the operations described herein as being performed by controller 120, operative circuitry 118, host processor 12, and/or card 102.

As shown in FIG. 1, administrator 10 may comprise a motherboard 32" and circuit board 102" that may comprise operative circuitry 118". The construction and components of motherboard 32", circuit board 102", and operative circuitry 118" may be substantially similar to the construction and components of motherboard 32, circuit board 102, and operative circuitry 118, except that the machine-readable program instructions that may be stored in the computer-readable memories 21" and 122" in motherboard 32" and operative circuitry 118", respectively, when executed by controller 120" and/or one or more host processors 12" may result in controller 120", operative circuitry 118", host processor 12", and/or card 102" performing the operations described herein as being performed by controller 120", operative circuitry 118", host processor 12", and/or card 102". Thus, with the foregoing proviso, motherboard 32", processor 12", chipset 14", memory 21", circuit board 102", circuitry 118", controller 120", and memory 122" may have substantially similar respective constructions as the respective constructions of motherboard 32, processor 12, chipset 14, memory 21, circuit board 102, circuitry 118, controller 120, and memory 122. Of course, without departing from this embodiment, the constructions of some or all of these components of administrator 10 and network server 160N may differ from each other.

Likewise, machine-readable program instructions may be stored in computer-readable memory that may be comprised in each client, network server 160A, and/or one or more components thereof, that when executed by each client, network server, and/or one or more components thereof, may result in the client, network server 160A, and/or one or more components (e.g., one or more host processors, controllers, operative circuitries, cards, etc.) thereof performing the operations described herein as being performed by these elements of system 100.

Each storage 28A . . . 28N and 29A . . . 29N may be comprised in one or more respective enclosures that may be separate from enclosures in which the respective motherboards (and/or other components) of network servers 160A . . . 160N may be enclosed. Alternatively, one or more of the storage 28A . . . 28N and/or 29A . . . 29N may be comprised in one or more of the enclosures that comprise one or more of the network servers 160A . . . 160N. In system 100, one or more network servers 160A . . . 160N and/or storage 28A . . . 28N and 29A . . . 29N coupled thereto may be comprised in one or more storage area networks 180.

Communication links 46A . . . 46N and 50N may be compatible with one or more communication protocols, and circuitry 118 may exchange data and/or commands with storage 29A . . . 29N, via links 46A . . . 46N, and with administrator 10 via links 50N, respectively, in accordance with these one or more communication protocols. Likewise, communication links 44A . . . 44N and 50A may be compatible with one or more communication protocols, and the operative circuitry that may be comprised in the controller card in network server 160A may exchange data and/or commands with storage 28A . . . 28N, via links 44A . . . 44N, and with administrator 10 via links 50A, respectively, in accordance with these one or more communication protocols.

For example, in this embodiment, one or more links 50A . . . 50N may be compatible with, and the respective operative circuitry of the respective controller cards in the network servers 160A . . . 160N may exchange data and/or commands with respective operative circuitry comprised in the respective controller card comprised in administrator 10 in accordance with, e.g., an Ethernet protocol and/or Transmission Control Protocol/Internet Protocol (TCP/IP) protocol. The Ethernet protocol utilized in system 100 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol utilized in system 100 may comply or be compatible with the protocols described in Internet Engineering Task Force (IETF) Request For Comments (RFC) 791 and 793, published September 1981. Of course, many different communication protocols may be used for such data and/or command exchange without departing from this embodiment.

Also for example, links 44A . . . 44N and 46A . . . 46N may be compatible with, and the respective operative circuitry that may be comprised in the respective controller cards of the network servers 160A . . . 160N may exchange data and/or commands with storage 28A . . . 28N and 29A . . . 29N in accordance with, e.g., a Fibre Channel Over Ethernet (FCoE) protocol and/or one or more other protocols (e.g., that may or may not be encapsulated in or capable of encapsulating one or more FCoE and/or Fibre Channel (FC) compatible frames), such as, for example, Small Computer Systems Interface (SCSI) protocol, Ethernet protocol, Transmission Control Protocol/Internet Protocol (TCP/IP) protocol, Serial Advanced Technology Attachment (S-ATA) protocol and/or Serial Attached Small Computer Systems Interface (SAS) protocol. Of course, alternatively, links 44A . . . 44N and 46A . . . 46N may be compatible with other and/or additional communication protocols, without departing from this embodiment.

In accordance with this embodiment, the FCoE protocol that may be utilized in system 100 may be compatible with the protocol described in, e.g., "FCoE Discovery," T11/07-572v1, published November 2007 by Technical Committee T11, International Committee For Information Technology Standards Secretariat, 1250 Eye Street NW, Suite 200, Washington, D.C. 20005, and/or other and/or later-published portions of this protocol. The FC protocol that may be utilized in system 100 may be compatible with the interface/protocol described in ANSI Standard Fibre Channel (FC) Physical and Signaling Interface-3 X3.303:1998 Specification. The SCSI protocol that may be utilized in system 100 may be compatible with the protocol described in American National Standards Institute (ANSI) Small Computer Systems Interface-2 (SCSI-2) ANSI X3.131-1994 Specification. The S-ATA protocol that may be utilized in system 100 may be compatible with the protocol described in "Serial ATA: High Speed Serialized AT Attachment," Revision 1.0, published on Aug. 29, 2001 by the Serial ATA Working Group. The SAS protocol that may be utilized in system 100 may be compatible with the protocol described in "Information Technology—Serial Attached SCSI (SAS)," Working Draft American National Standard of International Committee For Information Technology Standards (INCITS) T10 Technical Committee, Project T10/1562-D, Revision 2b, published 19 Oct. 2002, by American National Standards Institute. Of course, many other and/or additional communication protocols may be utilized in system 100 without departing from this embodiment.

Computer-readable memory 21 and 122 (as well as, the other computer-readable memories that may be comprised in each of the network servers, administrator, and client in system 100) may each comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable memory.

Figure 3:
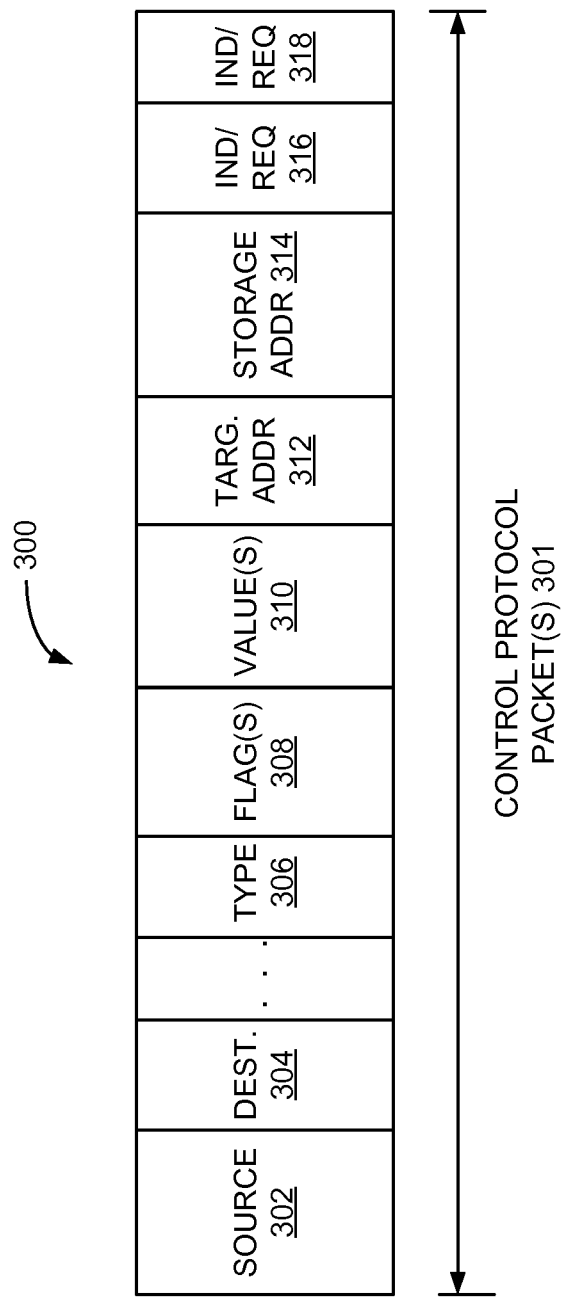
FIG. 3 illustrates an embodiment of another packet that may be used in the system embodiment of FIG. 1.
Figure 4:
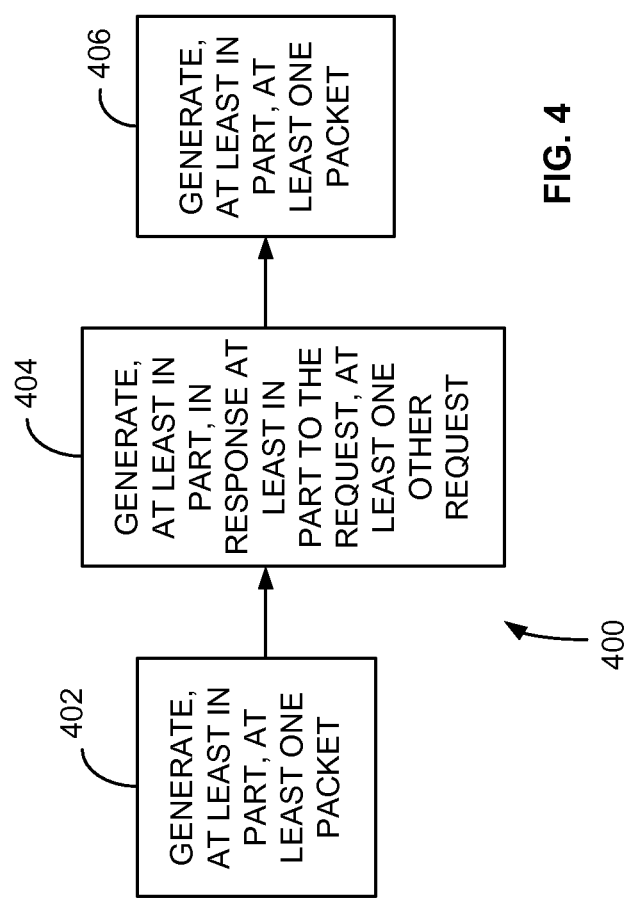
FIG. 4 illustrates operations that may be performed according to an embodiment.

FIG. 4 is a flowchart illustrating operations 400 that may be performed in system 100 according to an embodiment. In accordance with this embodiment, after and/or in response, at least in part to a command issued to administrator 10 by a human operator (not shown) via the not shown user interface comprised in administrator 10, the operative circuitry 118" comprised in the controller card 102" of administrator 10 may generate, at least in part, and issue, at least in part, to one or more network servers 160A . . . 160N via one or more links 50A . . . 50N at least one packet 200 or 300 (see operation 402 in FIG. 4). In this embodiment, one or more packets 200 or 300 may comprise one or more control protocol packets 201 or 301 shown in FIGS. 2 and 3, respectively. As used herein, a "packet" means one or more symbols and/or values. Also as used herein, a "control protocol packet" means a packet that is in accordance with and/or compatible with, at least in part, one or more protocols, and may be used in and/or to facilitate, at least in part, control, monitoring, determination, and/or identification, at least in part, of one or more features, capabilities, and/or statuses of one or more devices, processes, and/or services.

For example, in this embodiment, the human user of administrator 10 may issue to the host processor 12" and/or operative circuitry 118" comprised in administrator 10 a command to generate and issue to the one or more network servers 160A . . . 160N one or more packets 200 or 300 that may comprise, include, and/or represent one or more requests to the one or more network servers 160A . . . 160N that the one or more network servers 160A . . . 160N determine and/or identify, at least in part, at least one characteristic of at least one storage device 31A . . . 31N and 33A . . . 33N associated with the one or network servers 160A . . . 160N. In response, at least in part, to the command from the human user, the operative circuitry 118" in the controller card 102" in the administrator 10 may generate, at least in part, and issue, at least in part, one or more packets 200 or 300, specifying, comprising, indicating, and/or representing the human user's request for the determination and/or identification, at least in part, of the at least one characteristic of the at least one storage device 31A . . . 31N and 33A . . . 33N, to the one or more network servers 160A . . . 160N. Of course, alternatively or additionally, the one or more packets 200 or 300 could be generated and/or issued, at least in part, by the administrator 10 in response and/or as a result, in whole or in part, of an automated program or process executed by administrator 10 without intervention or command by a human operator.

Figure 2:
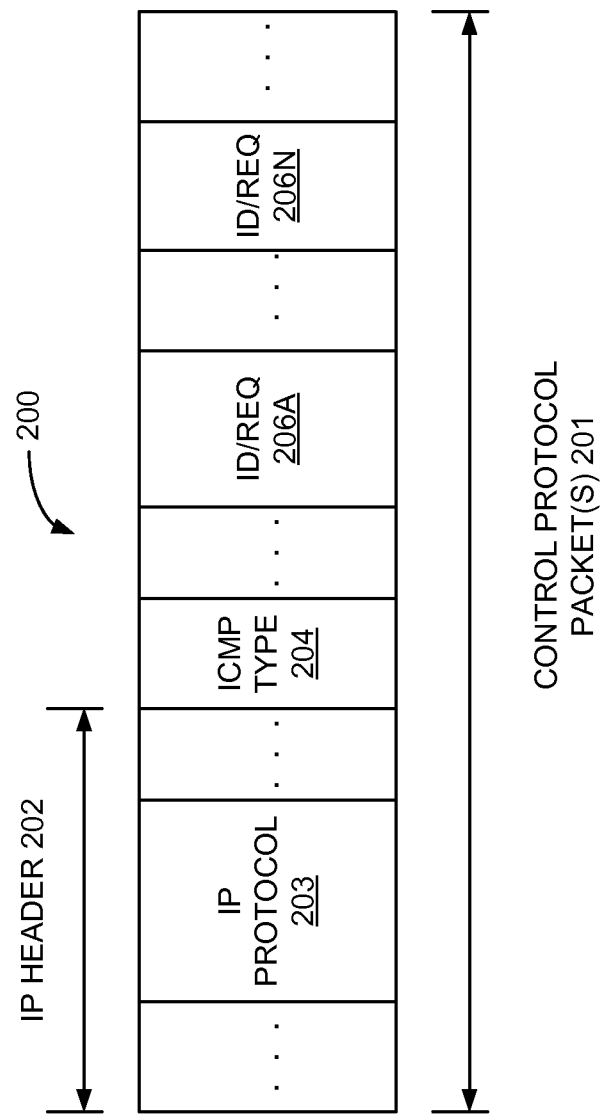
FIG. 2 illustrates an embodiment of a packet that may be used in the system embodiment of FIG. 1.

An embodiment of the one or more packets 200 is shown in FIG. 2. In the embodiment shown in FIG. 2, the one or more packets 200 may comprise one or more control protocol packets, such as, for example, one or more Internet Control Message Protocol (ICMP) packets 201 that are compatible with, e.g., IETF RFC 792, published September 1981. Each ICMP packet 201 of this embodiment comprises an IP header 202, ICMP type indicator 204, and one or more identifications/requests 206A . . . 206N. In this embodiment, the IP protocol field 203 contained in the IP header 202 may be or comprise an indication that the packet 201 is an ICMP control protocol packet by, e.g., having its value set equal to "1" (i.e., unity). Alternatively or additionally, ICMP type field 204 may be or comprise this indication by, e.g., having its value set equal to a predetermined value that is currently reserved (e.g., according to IETF RFC 792).

In this embodiment, the one or more identifications/requests 206A . . . 206N may be or comprise one or more symbols and/or values that may indicate, at least in part, the one or more characteristics of one or more storage devices 31A . . . 31N and/or 33A . . . 33N whose determination and/or identification are being requested, at least in part, by the one or more packets 200. For example, these one or more symbols and/or values may indicate, at least in part, the device or devices in system 100 to which the request is targeted (i.e., from which the determination and identification of the one or more storage characteristics are being requested) in terms of, for example, one or more target addresses identifying, at least in part, one or more network servers 160A . . . 160N, and/or one or more storage addresses identifying, at least in part, one or more storage 28A . . . 28N, 29A . . . 29N and/or one or more storage devices 33A . . . 33N. These target and/or storage addresses may be specified in terms of, for example, logical, physical, multicast, broadcast, and/or network server and/or storage device interface addresses. These one or more symbols and/or values may also indicate, at least in part, the one or more characteristics whose determination and identification, at least in part, is being requested. These one or more characteristics may include, for example, the availability of storage (e.g., whether storage 28A . . . 28N, 29A . . . 29N exists and/or whether storage in the storage devices 31A . . . 31N, 33A . . . 33N) is available for use by a client and/or administrator 10, the absolute amount and/or the available amount of storage in the system 100, as whole, in one or more of storage 28A . . . 28N, 29A . . . 29N and/or one or more storage devices 31A . . . 31N, 33A . . . 33N, and/or whether and/or how much the amount or amounts of such storage, as whole, in one or more of storage 28A . . . 28N, 29A . . . 29N and/or one or more storage devices 31A . . . 31N, 33A . . . 33N may exceed one or more threshold amounts. In this embodiment, the one or more characteristics whose determination and/or identification may be requested by the one or more packets 200 or 300 may comprise a plurality of characteristics of the plurality of storage devices 31A . . . 31N, 33A . . . 33N.

An embodiment of the one or more packets 300 is shown in FIG. 3. In the embodiment shown in FIG. 3, the one or more packets 300 may comprise one or more User Datagram Protocol (UDP) or TCP control protocol packets 301 that are compatible with, e.g., IETF RFC 768, published August 1980 (in the case of UDP) or IETF RFC 793, published September 1981 (in the case of TCP). Each UDP or TCP control protocol packet 301 of this embodiment may comprise a UDP or TCP header that includes source and destination indications 302 and 304. Additionally, each UDP or TCP control protocol packet 301 may include type indicator 306, one or more flags 308, one or more values 310, one or more target addresses 312, one or more storage addresses 314, and one or more requests/indications 316 and 318. In this embodiment, the purpose and operation of requests/indications 316 and 318 in one or more packets 301 are the same as those of identifications/requests 206A . . . 206N in one or more packets 201.

In this embodiment, the source indication 302 may be or comprise UDP or TCP source port information that corresponds to the application-layer service and/or process (e.g., an application-layer port interface service handler/daemon in administrator 10) that is issuing one or more packets 301 and is intended to receive and process one or more packets 300' (as discussed below). The destination indication 304 may be or comprise UDP or TCP destination port information that corresponds to application-layer port/interface service handlers/daemons residing in network servers 160A . . . 160N that are intended to receive and process one or more packets 301. In this embodiment, source indication 302 and destination indication 304 may be or comprise (either alone or in combination with other information contained in the UDP or TCP header) indications that the one or more packets 301 are one or more UDP or TCP control protocol packets.

Message type indicator 306 may contain one or more symbols and/or values that may identify, at least in part, whether the one or more packets 301 are associated with, at least in part, one or more intended recipients of the request comprised in requests/indications 316 and 318 in terms of one or more broadcast addresses, storage interface addresses, and/or server addresses. For example, message type 306 may indicate, at least in part, whether the one or more target addresses 312 and/or storage addresses 314 constitute logical, physical, broadcast, multicast, and/or unicast addresses, and/or whether addresses 312 and/or 314 address one or more network servers 160A . . . 160N and/or one or more storage device interface addresses comprised in and/or associated with the one or more network servers.

One or more flags 308 may indicate whether other options have been implemented in connection with how the other fields contained in one or more packets 301 should be interpreted. For example, depending upon the one or more symbols and/or values comprised in one or more flags 308, one or more flags 308 may indicate implementation of additional addressing options, such as, that one or more addresses 312 and/or 314 are Fibre Channel addresses and/or whether addresses 312 and/or 314 involve the use of SCSI logical units and/or other protocol and/or addressing encapsulation schemes.

One or more values 310 may contain one or more sequence numbers that may identify the request embodied in the one or more packets 300. These one or more sequence numbers may be contained in the corresponding one or more values 310 in one or more response packets 300' (described below) to associate, at least in part, the request embodied in the one or more packets 300 with the identification of one or more storage characteristics in one or more packets 300'.

After receiving the one or more packets 200 or 300, the respective operative circuitry comprised in the respective controller cards in servers 160A . . . 160N, the respective operative circuitry in servers 160A . . . 160N may determine from the one or more packets 200 or 300 the one or more (or in this embodiment, the plurality of) characteristics of one or more (or in this embodiment, the plurality of) storage devices 31A . . . 31N and/or 33A . . . 33N whose determination and/or identification are being requested by the one or more packets 200 or 300. In response, at least in part to this request, the operative circuitry comprised in the one or more network servers 160A . . . 160N may generate and issue, at least in part, to the storage devices 31A . . . 31N, 33A . . . 33N with which they are associated (e.g., to which they are communicatively coupled) one or more other packets 150 that may request that these storage devices identify their actual respective characteristics that may responsively correspond to the plurality of characteristics whose identification and/or determination were requested by one or more packets 200 or 300. (See operation 404 illustrated in FIG. 4).

In response, at least in part, to receipt of the one or more other packets 150 by storage devices 31A . . . 31N, 33A . . . 33N, the storage devices may determine their actual respective characteristics whose identification was requested by one or more other packets 150, and may generate and issue, at least in part, to the network servers 160A . . . 160N with which they are associated one or more packets 152 that may so identify these actual respective characteristics.

In response, at least in part, to receipt of one or more packets 152 by network servers 160A . . . 160N, each respective network server 160A . . . 160N may aggregate the respective actual characteristics (as identified in the one or more packets 152) of the respective storage devices 31A . . . 31N and 33A . . . 33N with which the respective network server is associated. For example, network server 160A may aggregate the respective actual characteristics (as identified in the one or more packets 152) for storage devices 31A . . . 31N with which network server 160A is associated. Likewise, network server 160N may aggregate the respective actual characteristics (as identified in the one or more packets 152) for storage devices 33A . . . 33N with which network server 160N is associated. The respective operative circuitry comprised in the respective controller cards in the respective network servers 160A . . . 160N then may generate and issue, at least in part, one or more packets 200' or 300' that may contain the indication, at least in part, of the identification of the one or more (and, in this embodiment, the plurality of) actual characteristics of the one or more (and, in this embodiment, the plurality of) storage devices whose identification and/or determination were requested by one or more packets 200 or 300. In this embodiment, the number of packets comprised in one or more packets 200' or 300' may be at least equal to the number of network servers 160A . . . 160N in system 100, and the respective operative circuitry comprised in each respective network server 160A . . . 160N may generate and issue, at least in part, at least one respective packet 200' or 300' that may contain a respective indication of the respective aggregated actual characteristics of the respective storage devices with which the respective network server is associated.

For example, in this embodiment, if as a result of operation 402, one or more packets 200 were generated and issued, at least in part, by the operative circuitry comprised in administrator 10, each of the network servers 160A . . . 160N may generate and issue, at least in part, to administrator 10, in response, at least in part, to the request comprised in one or more packets 200, one or more respective packets 200' that may indicate, at least in part, respective identifications of the aggregated actual characteristics of the storage devices 31A . . . 31N, and 33A . . . 33N, respectively, with which the respective network server is associated that are responsive to the request comprised in the one or more packets 200. (See operation 406 in FIG. 4). In this embodiment, the structure and contents of one or more packets 200' may be similar to the structure and contents of one or more packets 200 shown in FIG. 2, except that, in one or more packets 200', the address information (and/or other information) contained in header 202 may be changed to permit routing of the one or more packets 200' from the network servers 160A . . . 160N to the administrator 10 and one or more identifications/requests 206A . . . 206N may be or comprise one or more symbols and/or values that may indicate an identification (or in this embodiment, a plurality of such identifications) of the respective actual aggregated characteristics of the storage devices with which the network servers are associated. In one or more packets 200', the contents of IP protocol field 203 and ICMP type field 204 may be the same their counterparts in one or more packets 200.

Conversely, if as a result of operation 402, one or more packets 300 were generated and issued, at least in part, by the operative circuitry comprised in administrator 10, each of the network servers 160A . . . 160N may generate and issue, at least in part, to administrator 10, in response, at least in part, to the request comprised in one or more packets 300, one or more respective packets 300' that may indicate, at least in part, respective identifications of the aggregated actual characteristics of the storage devices 31A . . . 31N, and 33A . . . 33N, respectively, with which the respective network server is associated that are responsive to the request comprised in the one or more packets 300. (See operation 406 in FIG. 4). In this embodiment, the structure and contents of one or more packets 300' may be similar to the structure and contents of one or more packets 300 shown in FIG. 3, except that in one or more packets 300', the UDP or TCP source port and destination port information contained in source and destination indication 302 and 304 may be changed to permit delivery of the one or more packets 300' from the respective application-layer services and/or processes (e.g., the respective application-layer port/interface service handlers/daemons residing in) network servers 160A . . . 160N to the appropriate application-layer service and/or process residing in administrator 10 to process the one or more packets 300', and one or more requests/indications 316 and 318 may be or comprise one or more symbols and/or values that may indicate an identification (and in this embodiment, a plurality of identifications) of the respective actual aggregated characteristics of the storage devices with which the network servers are associated.

As stated previously, packets 301 and 301' may be either UDP or TCP packets. If packets 301 and 301' are UDP packets, this may advantageously reduce the amount of processing overhead in this embodiment associated with transmission and processing of packets 301 and 301' (e.g., by utilizing UDP connection-less services instead of TCP connection-oriented services) compared to the overhead that may result if packets 301 and 301' are TCP packets.

Thus, in summary, a system embodiment may include an apparatus that may comprise circuitry capable of generating, at least in part, at least one packet. The at least one packet may include an indication that the at least one packet comprises a control protocol packet. The at least one packet also may include, at least in part, an identification, at least in part, of at least one characteristic of at least one storage device, and/or the at least one packet may indicate, at least in part, a request for the identification. The at least one storage device may be associated, at least in part, with at least one network server. The identification may be generated, at least in part, in response, at least in part, to the request for the identification.

Thus, in this system embodiment, the at least one control protocol packet 201, 301, 201', or 301' may be compatible with a standard, non-proprietary protocol, such as, IP, TCP, or UDP. This may advantageously decrease the cost and complexity, and enhance the interoperability of this system embodiment (and/or components thereof) compared to the prior art. Also advantageously, this may reduce the management time and effort involved in implementing this system embodiment compared to the prior art.

Additionally, in this system embodiment, the at least one control protocol packet 201 or 301 is transmitted to and processed by the one or more network servers 160A . . . 160N, not the one or more storage devices 31A . . . 31N, 33A . . . 33N, and the at least one control protocol packet 201' or 301' identifies the actual aggregated characteristics of one or more storage devices associated with the one or more network servers. Advantageously, this reduces the amount of the administrator's processing resource bandwidth consumed in this system embodiment compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Indeed, without departing from this embodiment, system 100 may include more or fewer than the elements shown in the Figures and described previously herein as being comprised system 100. Accordingly, the claims are intended to cover all such equivalents.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus comprising:
   circuitry capable of generating, at least in part, at least one packet that includes an indication that the at least one packet comprises a control protocol packet, the at least one packet also including, at least in part, at least one of:
     an identification, at least in part, of at least one characteristic of at least one storage device associated, at least in part, with at least one network server, the identification being generated, at least in part, in response, at least in part, to a request for the identification, the identification to be contained, at least in part, in one or more responses to the request, and
     the request for the identification;
   the indication indicating, at least in part, that the at least one packet comprises, at least in part:
     an application-layer control protocol packet, the application-layer control protocol packet also indicating, at least in part, at least one value associating, at least in part, the request with the identification, the at least one value containing one or more sequence numbers that are contained in both the request and the one or more responses, the one or more sequence numbers identifying the request;
   wherein:
     the application-layer control protocol packet also indicates, at least in part:
       at least one target address identifying, at least in part, the at least one network server,
       at least one storage address identifying, at least in part, the at least one storage device, and
       a message type identifying, at least in part, whether the application-layer control protocol packet is associated, at least in part, with one or more of a broadcast address, a storage interface address, and a server address.

2. The apparatus of claim 1, further comprising:
   a circuit board that comprises, at least in part, the circuitry, the circuit board being capable of being coupled to a motherboard; and
   at least one storage area network that comprises the at least one network server and the at least one storage device.

3. The apparatus of claim 2, wherein:
   the apparatus further comprises an administrator communicatively coupled to the at least one network server; and
   the administrator comprises the circuit board.

4. The apparatus of claim 1, wherein:
   the at least one characteristic comprises at least one of availability of storage in the at least one storage device, absolute amount of the storage available, and an excess amount of the storage available that exceeds a threshold.

5. The apparatus of claim 1, wherein:
   the at least one storage device comprises a plurality of storage devices;
   the circuitry is capable of generating, at least in part, in response, at least in part, to the request, at least one other request that the plurality of storage devices identify a plurality of characteristics of the plurality of storage devices; and
   the circuitry also is capable of generating, at least in part, based at least in part upon the plurality of characteristics, the identification.

6. A method comprising:
   generating, at least in part, at least one packet that includes an indication that the at least one packet comprises a control protocol packet, the at least one packet also including, at least in part, at least one of:
     an identification, at least in part, of at least one characteristic of at least one storage device associated, at least in part, with at least one network server, the identification being generated, at least in part, in response, at least in part, to a request for the identification, the identification to be contained, at least in part, in one or more responses to the request, and
     the request for the identification;
   the indication indicating, at least in part, that the at least one packet comprises, at least in part:
     an application-layer control protocol packet, the application-layer control protocol packet also indicating, at least in part, at least one value associating, at least in part, the request with the identification, the at least one value containing one or more sequence numbers that are contained in both the request and the one or more responses, the one or more sequence numbers identifying the request;
   wherein:
     the application-layer control protocol packet also indicates:
       at least one target address identifying, at least in part, the at least one network server,
       at least one storage address identifying, at least in part, the at least one storage device, and
       a message type identifying, at least in part, whether the application-layer control protocol packet is associated, at least in part, with one or more of a broadcast address, a storage interface address, and a server address.

7. The method of claim 6, wherein:
   the at least one packet is generated, at least in part, by circuitry;
   a circuit board comprises, at least in part, the circuitry, the circuit board being capable of being coupled to a motherboard; and
   at least one storage area network comprises the at least one network server and the at least one storage device.

8. The method of claim 7, wherein:
   the at least one network server is communicatively coupled to an administrator; and
   the administrator comprises the circuit board.

9. The method of claim 6, wherein:
   the at least one characteristic comprises at least one of availability of storage in the at least one storage device, absolute amount of the storage available, and an excess amount of the storage available that exceeds a threshold.

10. The method of claim 6, wherein:
    the at least one storage device comprises a plurality of storage devices;
    the method further comprises generating, at least in part, in response, at least in part, to the request, at least one other request that the plurality of storage devices identify a plurality of characteristics of the plurality of storage devices; and
    the identification is generated, at least in part, based at least in part upon the plurality of characteristics.

11. Machine-readable memory storing one or more instructions that when executed by a machine result in execution of operations comprising:

generating, at least in part, at least one packet that includes an indication that the at least one packet comprises a control protocol packet, the at least one packet also including, at least in part, at least one of:

an identification, at least in part, of at least one characteristic of at least one storage device associated, at least in part, with at least one network server, the identification being generated, at least in part, in response, at least in part, to a request for the identification, the identification to be contained, at least in part, in one or more responses to the request, and the request for the identification;

the indication indicating, at least in part, that the at least one packet comprises:

an application-layer control protocol packet, the application-layer control protocol packet also indicating, at least in part, at least one value associating, at least in part, the request with the identification, the at least one value containing one or more sequence numbers that are contained in both the request and the one or more responses, the one or more sequence numbers identifying the request;

wherein:

the application-layer control protocol packet also indicates:

at least one target address identifying, at least in part, the at least one network server, at least one storage address identifying, at least in part, the at least one storage device, and a message type identifying, at least in part, whether the application-layer control protocol packet is associated, at least in part, with one or more of a broadcast address, a storage interface address, and a server address.

12. The memory of claim 11, wherein:

the at least one packet is generated, at least in part, by circuitry;

a circuit board comprises, at least in part, the circuitry, the circuit board being capable of being coupled to a motherboard; and at least one storage area network comprises the at least one network server and the at least one storage device.

13. The memory of claim 12, wherein:

at least one other network server is communicatively coupled to an administrator; and the administrator comprises the circuit board.

14. The memory of claim 11, wherein:

the at least one characteristic comprises at least one of availability of storage in the at least one storage device, absolute amount of the storage available, and an excess amount of the storage available that exceeds a threshold.

15. The memory of claim 11, wherein:

the at least one storage device comprises a plurality of storage devices;

the operations further comprise generating, at least in part, in response, at least in part, to the request, at least one other request that the plurality of storage devices identify a plurality of characteristics of the plurality of storage devices; and the identification is generated, at least in part, based at least in part upon the plurality of characteristics.

* * * * *